(12) United States Patent
Twerdochlib

(10) Patent No.: US 7,836,772 B2
(45) Date of Patent: Nov. 23, 2010

(54) METHOD AND APPARATUS FOR TRACKING A ROTATING BLADE TIP FOR BLADE VIBRATION MONITOR MEASUREMENTS

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 531 days.

(21) Appl. No.: 11/861,582

(22) Filed: Sep. 26, 2007

(65) Prior Publication Data

US 2009/0078053 A1    Mar. 26, 2009

(51) Int. Cl.
*G01H 11/00* (2006.01)
(52) U.S. Cl. .............................. 73/661; 73/593; 73/660
(58) Field of Classification Search .................. 73/660, 73/583, 593, 661, 584, 662; 702/115, 183
See application file for complete search history.

(56) References Cited

U.S. PATENT DOCUMENTS

| | | | |
|---|---|---|---|
| 4,373,804 A * | 2/1983 | Pryor et al. ................. 356/3.07 |
| 4,887,468 A | 12/1989 | McKendree et al. |
| 4,907,456 A | 3/1990 | Rozelle |
| 5,097,711 A * | 3/1992 | Rozelle et al. ................. 73/660 |
| 5,206,816 A * | 4/1993 | Hill et al. ....................... 702/56 |
| 5,479,826 A * | 1/1996 | Twerdochlib et al. ......... 73/660 |
| 5,736,643 A * | 4/1998 | Bores et al. .................... 73/660 |
| 5,761,956 A * | 6/1998 | Beeson et al. ................. 73/660 |
| 6,708,565 B2 * | 3/2004 | Lin et al. ....................... 73/660 |
| 7,297,933 B2 * | 11/2007 | Yamada et al. .......... 250/227.26 |
| 7,509,862 B2 * | 3/2009 | Cohen et al. ................... 73/660 |
| 7,654,145 B2 * | 2/2010 | Twerdochlib ................ 73/660 |

* cited by examiner

*Primary Examiner*—J M Saint Surin

(57) ABSTRACT

A method and apparatus for monitoring vibrations in a blade structure of a turbine including generating signals from a probe located adjacent to a radial outer edge of the blade structure to provide signals corresponding to vibrations at predetermined locations along the tips of the blades. A leading edge of a blade tip is detected during a blade tracking operation, and a known location along the length of the blade tips is monitored during a vibration measurement operation. The measurement operation may be performed simultaneously with the tracking operation to provide measurements as the axial location of the blades change during transitional modes of operation of the turbine.

16 Claims, 4 Drawing Sheets

METHOD AND APPARATUS FOR TRACKING A ROTATING BLADE TIP FOR BLADE VIBRATION MONITOR MEASUREMENTS

FIELD OF THE INVENTION

The present invention relates to a method of monitoring a blade structure in a turbine and, more particularly, to a method of tracking the location of a blade tip to provide time-of-arrival measurements from a known location on the blade tip for use in a blade vibration monitoring system.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. In order to avoid the vibration exceeding certain levels and setting up objectionable stresses in the blades, it is common to monitor the vibrations of the blades, both during the design and testing of the turbine and during normal operation of the turbine. For example, it is known to use non-contacting proximity sensors or probes to detect blade vibrations. The probes detect the actual time-of-arrival of each blade as it passes each probe and provide corresponding signals to a blade vibration monitor system (BVM). Small deviations due to vibration are extracted, from which the BVM may determine the amplitude, frequency, and phase of the vibration of each blade.

The measured vibration amplitude is highly dependent on correct positioning of the sensor above the blade target, which may comprise a target affixed to the blade, a feature of the blade or the blade tip itself. Further, there is a current interest in obtaining measurement of high frequency vibration modes that result in failures of small gas turbine compressor blades, unlike lower vibration modes that result in movement of the blade as a whole, these high frequency modes form closely spaced nodes and antinodes across the compressor blades. The distance between nodes, i.e., between the BVM maximum measurements, and antinodes, i.e., between no BVM measurements, can be centimeters. Unlike lower modes, it is imperative that the actual point measured by the BVM on the blade be known in order to use this measurement as a boundary point to calculate the maximum stress in the blade and hence accurately determine loss of blade life.

In one known system of obtaining time-of-arrival data from rotating blades, a five lens laser line probe spreads a laser light into a line that spans a portion of the blade tip to be certain that either the leading blade tip edge or trailing blade tip edge is detected as the time-of-arrival. A pulse of light is produced by the laser light reflected from the tip edge as it passes the probe, and is received by the probe. If the probe is positioned over the leading edge, a leading pulse edge indicates the arrival of the leading blade tip edge, providing a vibration measurement at the leading tip edge. If the probe is positioned over the trailing blade tip edge, a falling pulse edge indicates the leaving trailing blade tip edge, providing a vibration measurement at the trailing tip edge. Such a measurement requires that the line of laser light overhang the leading or trailing edge to ensure that the leading or trailing edge is intercepted, in that a "missed edge" condition will not be detected by this probe. In addition, the measurements provided by these line probes are limited to the vibration occurring at the leading or trailing edge, and the reflected signals provided by these probes are weak since the laser light must be distributed over a line, rather than being provided to a single small point on the blade tip edge.

It is desirable to be able to obtain vibration measurements at various locations along the length of the blade tip, in addition to the blade tip edges, and it is also important to accurately know where the vibration is measured along the blade tip to enable calculation of vibrations elsewhere in the blade and to determine the maximum stress developed in the blade. Current vibration measurement techniques generally do not provide accurate information as to the exact position along the blade tip of the vibration measurements. Further, this unknown position of the vibration measurements changes as the rotor moves axially with respect to the case mounted sensor due to spins up and down, as the turbine warms up and cools down, and as the load on the turbine changes. Hence, it is not possible to accurately predict vibration elsewhere in the blade, or determine the maximum stress developed in the blade.

SUMMARY OF THE INVENTION

In accordance with one aspect of the invention, a method is provided for monitoring a blade structure in a turbine comprising a plurality of radially extending blades mounted on a rotor for rotation about a rotational axis. The method comprises the steps of providing a probe structure including a probe supported in a probe mount adjacent the blade structure, the probe being supported for movement relative to the probe mount for sensing blade passing events, moving the probe to a tracking position to identify a location of a trigger point on the blade structure, moving the probe to a measurement position corresponding to a measurement point on the blade structure wherein the measurement position is determined with reference to the tracking position, and transmitting sensor signals from the probe to a blade vibration monitor wherein the sensor signals correspond to vibrations produced at the measurement point.

In accordance with another aspect of the invention, an apparatus is provided for monitoring a blade structure in a turbine comprising a plurality of radially extending blades mounted on a rotor for rotation about a rotational axis. The apparatus comprises a probe structure including a probe supported in a probe mount adjacent the blade structure. The probe is supported for movement relative to the probe mount for sensing blade passing events. The probe includes a tracking channel for tracking a trigger point on the blade structure and a measurement channel for detecting a measurement point on the blade structure. A blade vibration monitor is provided for receiving sensor signals transmitted from the measurement channel wherein the sensor signals correspond to vibrations produced at the measurement point.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
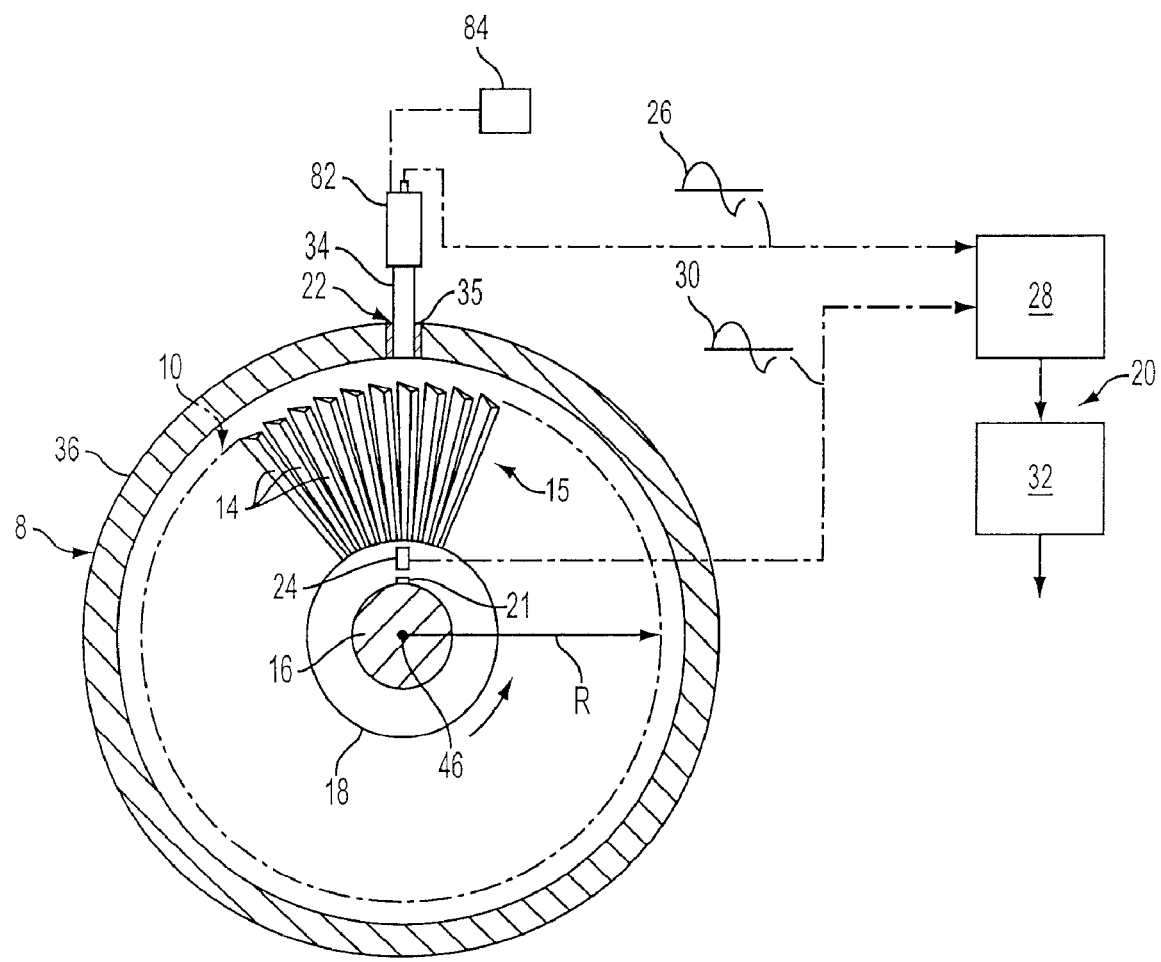
FIG. 1 is a diagrammatic view illustrating a turbine and a blade vibration monitor system incorporating the present invention.

FIG. 1 diagrammatically illustrates a turbine 8 including an unshrouded compressor blade row 10 in which the method and apparatus of the present invention can be employed in a blade vibration monitoring system to monitor nonsynchronous compressor blade vibrations. Turbine blades 14 are connected to a rotor 16 by means of a rotor disk 18 and form a blade structure 15 within the turbine 8.

A nonsynchronous turbine blade vibration monitoring system (BVM) 20 is also shown in FIG. 1. The system 20 includes a turbine blade probe structure 22 for monitoring the vibration of the turbine blades 14. It should be understood that although only one probe structure 22 is described herein with reference to the present invention, plural probe structures 22 may be provided in circumferentially spaced relation to each other.

As further illustrated in FIG. 1, a reference sensor 24 is additionally provided. The reference sensor 24, in conjunction with an indicia 21 on the rotor 16, is operable to provide a once-per-revolution (OPR) reference pulse signal 30. The production of such a reference signal is commonly known in the turbine art.

Input signals 26 from the probe structure 22 are provided as inputs to a blade vibration processor 28. The signal 30 from reference sensor 24 is additionally provided as an input to the blade vibration processor 28. The output of the blade vibration processor 28 is input to a signal analyzer 32 which may perform signal conditioning and analysis.

Figure 2:
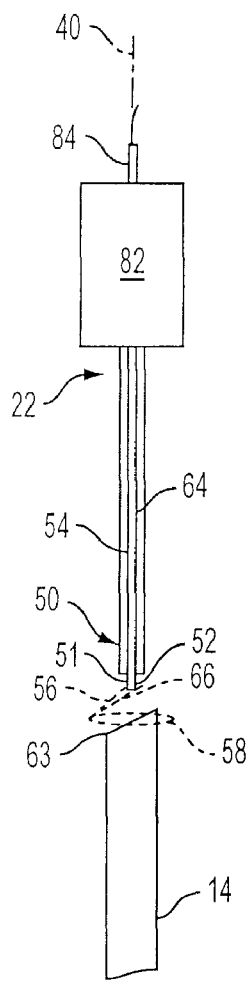
FIG. 2 is a diagrammatic elevation view of a probe structure in relation to a turbine blade.

Referring to FIGS. 1 and 2, the probe structure 22 may comprise a probe 34 for extending through a casing or wall portion 36 of the turbine 8. The probe 34 is supported for rotational movement about a probe rotational axis 40. The mounting of the probe structure 22 through the wall portion 36 of the turbine 8 may comprise a probe mount 35, such as is described, for example, in U.S. Pat. No. 4,887,469, which patent is hereby incorporated by reference. In addition, the probe mount 35 may comprise a rotating seal (not shown) to support the probe 34 for rotation through the compressor pressure boundary.

The probe 34 defines a sensor for sensing the passage of blades 14 during rotation of the rotor, and the probe 34 preferably comprises a laser channel 50 including a laser spot source 51 and a light pulse receiver 52, as illustrated diagrammatically in FIG. 2. The laser spot source 51 may comprise a fiber optic path 54 that terminates at a lens (not shown) located adjacent the blade structure 15. The lens at the end of the fiber optic path 54 causes the laser light passing through the fiber optic path 54 to be a focused laser light 56. Hence, as the probe 34 is rotated about the probe rotational axis 40, the focused laser light 56, see FIG. 2, will follow a circular laser spot circle 58 having a predetermined diameter that is selected to extend to intersection points with blade tip leading edges 60 and blade tip trailing edges 62, as well as points along the blade tips 63 therebetween, see FIG. 3. The light pulse receiver 52 comprises a second fiber optic path 64 having an optical path 66 extending from an end thereof that intersects the path of the focused laser light 56 about an inch from the tip of the probe 34, referred to as the focal position of the probe 34. The light pulse receiver 52 detects or senses light pulses produced as each blade tip 63 passes through and reflects the focused laser light 56, defining a target or blade passing event.

In the illustrated embodiment of FIG. 2, the line of light 56 extending from the end of the fiber optic path 54 may be bent from a line parallel to the probe 34, and the receiver optical path 66 may be similarly angled. However, in a preferred embodiment, the line of light 56 may extend parallel to the probe axis 40, with the receiver optical path 66 also extending substantially parallel to the probe axis 40 to provide a long focal distance along which these two paths intersect.

Variations in the measured vibration amplitude, frequency and phase of each of the blades 14 is detected by a measurement of the passage of the blades 14 relative to the detected OPR reference signal 30 from the sensor 24, and may be specified in terms of an angle of rotation of the rotor 16 from the detection of the reference signal 30 to the target passing event corresponding to the light pulse receiver 52 detecting a light pulse, and the probe 34 producing a corresponding input signal 26.

Figure 3:
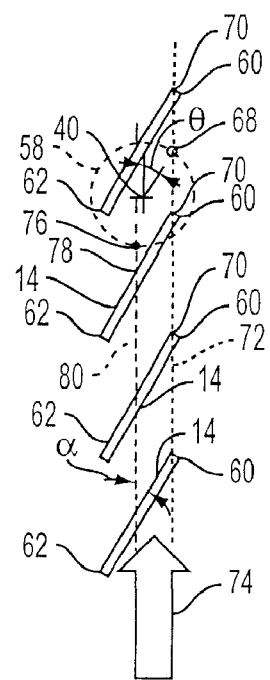
FIG. 3 is a diagrammatic view taken from a radial outer location inwardly showing a plurality of turbine blades in relation to a laser tracking path provided by the probe structure of FIG. 2.

Referring to FIG. 3, in a method of monitoring the blade structure 15 to detect blade vibrations using the BVM 20, the probe 34 is rotated about the probe rotational axis 40 to move the focused laser light 56, and associated light pulse receiver path 66, along the spot circle 58 to a tracking position 68. The tracking position 68 for the illustrated embodiment is defined at a location where the focused laser light 56 is intersected by trigger points 70 defined at the tip leading edges 60, as is depicted by an imaginary dashed line path 72 extending in the direction 74 of blade travel. The dashed line path 72 defines an axial reference line for the axial location of the blades 14 relative to the probe rotational axis 40. The step of locating the tip leading edge 60 may comprise rotating the probe 34 until the reflected light detected by the light pulse receiver 52 just disappears, indicating the location of the tip leading edge 60. It should be noted that although the probe 34 may be rotated through the full circle 58 depicted in FIG. 3, in accordance with the present embodiment the rotation of the probe 34 is limited to 200 degrees, as this provides full movement for positioning the focused laser light 56 to either diametric side of the spot circle 58 spanning the length of the blade tip 63. In the illustrated embodiment, the spot circle 58 has a diameter of approximately one inch.

After the axial location of the blades 14 is determined based on the position of the dashed line path 72, corresponding to the tracking position 68, the probe 34 is then rotated about the probe rotational axis 40 to move the focused laser light 56 to a measurement position 76. The measurement position 76 is selected to intersect the blades 14 at a preselected measurement point 78 on each blade 14, along an imaginary dashed line measurement path 80 extending in the direction 74 of blade travel. The angular position Θ of the probe 34 may be used to determine the locations of the trigger point 70 and the measurement point 76 relative to the probe 34. Specifically, in the embodiment where the line of light 56 and the receiver optical path 66 extend parallel to the probe axis 40, the locations of the trigger point 70 and the measurement point 78 on the blades 14 may be determined using geometry and the known, measured value for the angular position Θ, and the known blade slope angle α of the blades 14. In the embodiment where the line of light 56 and the receiver optical path 66 extend at an angle from the probe 34, the locations of the trigger point 70 and the measurement point 78 on the blades 14 may be determined using geometry and the known, measured value for the angular position Θ, the known blade slope angle α of the blades 14, the angle of the focused light beam 56, and the distance to the blade tips 63 from the end of the probe 34. While there is some advantage to providing the line of 56 and receiver optical path 66 at an angle from the probe, in that this may reduce the required diameter of the probe 34, this also requires a determination of the distance between the probed tip and the blade tip, which can change as the temperature changes. However, it is possible to calculate the probe tip-to-blade tip distance using the known length of the blade tip 63, the blade slope angle α, and an angular measurement obtained by measuring the angular position of the probe 34 between the locations for detecting the leading edge 60 and the trailing edge 62.

The geometric relationship between the axial location of the blades 14, the angular position Θ of the probe 34 and the blade slope angle α is set out in greater detail in patent application U.S. Ser. No. 11/861,532 entitled METHOD OF ON-LINE TURBINE BLADE SLOPE AND SENSOR POSITION VERIFICATION, the entire disclosure of which is incorporated herein by reference. In addition, the blade slope angle α may also be verified and/or determined using the techniques set forth in the above-referenced U.S. Patent Application.

The focused laser light 56 may be moved to any axial location along the blades 14 to define a selected location for the measurement point 78 based on the known location of the tip leading edge 60. Further, the location of the tip leading edge 60 may be continuously or periodically verified or updated by rotating the probe 34 to position the focused laser light 56 to the tracking position 68, and then rotating the probe 34 to position the focused laser light 56 to an updated measurement position 76. The rotational movement of the probe 34 is slow such that BVM signals 26 may continue to be processed during movement of the probe 34, and the movement of the laser spot along the spot circle 58 produces no more than a DC offset in the BVM signals. Hence, a continuous scanning of the blade vibration amplitude may be provided along the entire length of the blade tip 63.

Rotation of the probe 34 may be effected by a known driver 82, see FIG. 1, for effecting precise rotational control of the probe 34. For example, the present embodiment may use a known precision translation instrument head to provide precise computer controlled rotational movement of the probe 34. In particular, the driver 82 may comprise a pulse width modulated drive DC motor operating through a planetary gear reduction drive train to provide a high torque precise rotational control to a shaft 84 coupled to the probe 34. The driver 82 may operate under control of a computer in the BVM 20 or, alternatively, an additional computer 83 may be provided for controlling the rotation of the probe 34. In addition, a sensor, such as an optical resolver (not shown), may be mounted directly on the shaft 84 to provide an accurate indication of small digital incremental rotations of the shaft 84 and associated probe 34.

Figure 4:
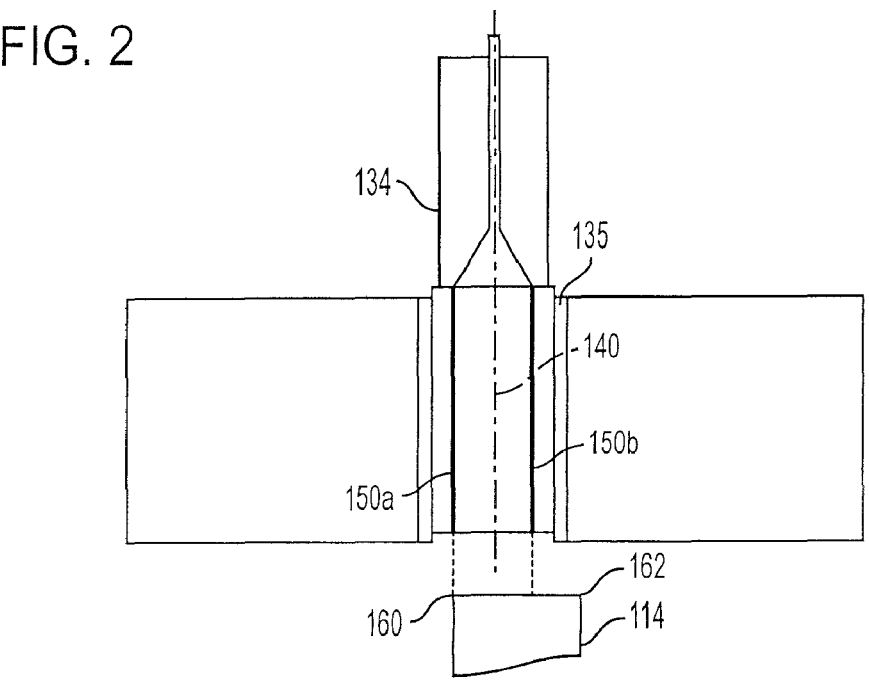
FIG. 4 is a diagrammatic elevation view of a probe structure of a second embodiment of the invention.

A second embodiment of the invention is illustrated in FIG. 4, in which elements corresponding to elements of the first embodiment are labeled with the same reference numeral increased by 100. As seen in FIG. 4, a probe 134 is provided including a first, tracking channel 150*a* and a second, measurement channel 150*b* mounted in diametrically spaced relation to each other, see also FIGS. 5A and 5B. The tracking channel 150*a* and measurement channel 150*b* each include a laser spot source and light pulse receiver similar to the first embodiment described with reference to FIG. 2.

In the embodiment illustrated in FIG. 4, the tracking channel 150*a* and measurement channel 150*b* are parallel and spaced apart approximately one-half to three-quarters inch for movement around a laser spot circle 158. Rotation of the probe 134 results in coupled displacement of the tracking channel 150*a* and measurement channel 150*b* in the axial direction perpendicular to the direction 174 of blade travel, see FIGS. 5A and 5B.

Figure 5A:
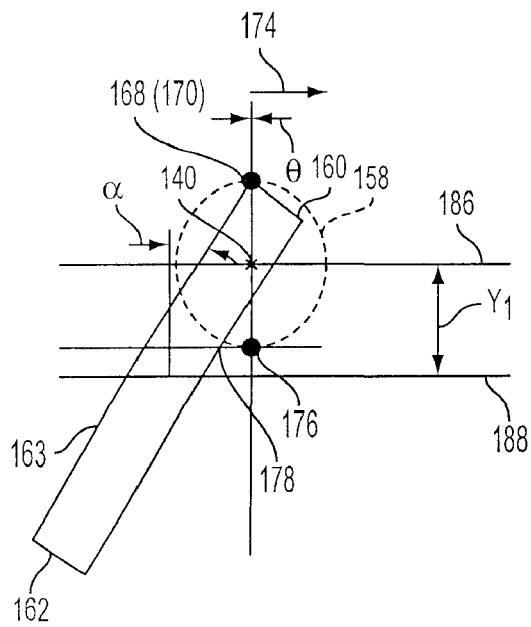
FIGS. 5A and 5B are diagrammatic views illustrating a blade tracking operation performed by the probe structure of FIG. 4.

The probe 134 is rotated to locate the tracking channel 150*a* at a tracking position 168 to detect the tip leading edge 160, i.e., the trigger point 170 on the blade 114. Positioning of the tracking channel 150*a* concurrently positions the measurement channel 150*b* at a measurement position 176 for receiving vibration data in the form of reflected light pulses received from a measurement point 178 located along the blade tip 163 in between the tip leading edge 160 and the tip trailing edge 162. As described for the previous embodiment, the precise location of the measurement point 178 along the blade tip 163 may be determined from the tracking position 168 of the tracking channel 150*a*, as measured by the angular position Θ, and the known blade slope angle α, see FIGS. 5A and 5B. In FIG. 5A the illustrated angular position Θ is zero degrees.

Figure 5B:
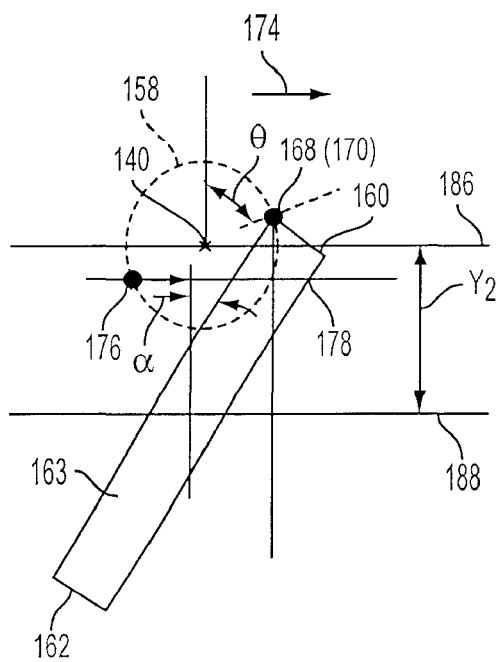

FIGS. 5A and 5B illustrate the blade 114 in first and second axial positions, respectively, relative to a reference line 186 passing through the center of the probe 134. The first and second axial positions of the blade 114 may represent an axial drift of the blade 114 such as may result from a temperature change of the turbine such as during turbine warm up or cool down. Alternatively, the rotor may drift axially as a result of variation in the forces exerted during spin up and spin down of the turbine, as well as in response to changes in the load on the turbine. In addition, some turbines can also move the rotor axially to optimize clearances in the turbine portion of the machine. The displacement of the blade 114 is the difference between dimensions $y_1$ and $y_2$ in FIGS. 5A and 5B, where $y_1$ and $y_2$ comprise measurements between a line 188 passing through the center of the blade 114 and the reference line 186 passing through the probe rotational axis 140. In the present embodiment, the probe 134 may be rotated by a driver similar to the driver 82 described for the first embodiment, and the measurement channel 150*b* may operate continuously to provide vibration measurement signals as the tracking channel 150*a* continuously tracks a known location of the trigger point 170.

Referring to FIGS. 6A, 6B, 7 and 8, a third embodiment is illustrated in which elements corresponding to elements of the first embodiment are labeled with the same reference numeral increased by 200. The third embodiment is similar to the second embodiment in that a probe 234 is provided having a tracking channel 250a and a measurement channel 250b similar to the tracking channel 150a and measurement channel 150b of probe 134. However, in the present embodiment, the tracking channel 250a and measurement channel 250b are supported on concentric first and second probe shafts 234a, 234b at different radii from a probe rotational axis 240, see FIG. 7. In the illustrated embodiment, the tracking channel 250a follows a circular path 258a that is displaced radially inwardly from a circular path 258b followed by the measurement channel 250b, see FIGS. 6A and 6B, and the first and second probe shafts 234a, 234b are supported within the probe 234 for independent rotational movement about the axis 240.

Figure 8:
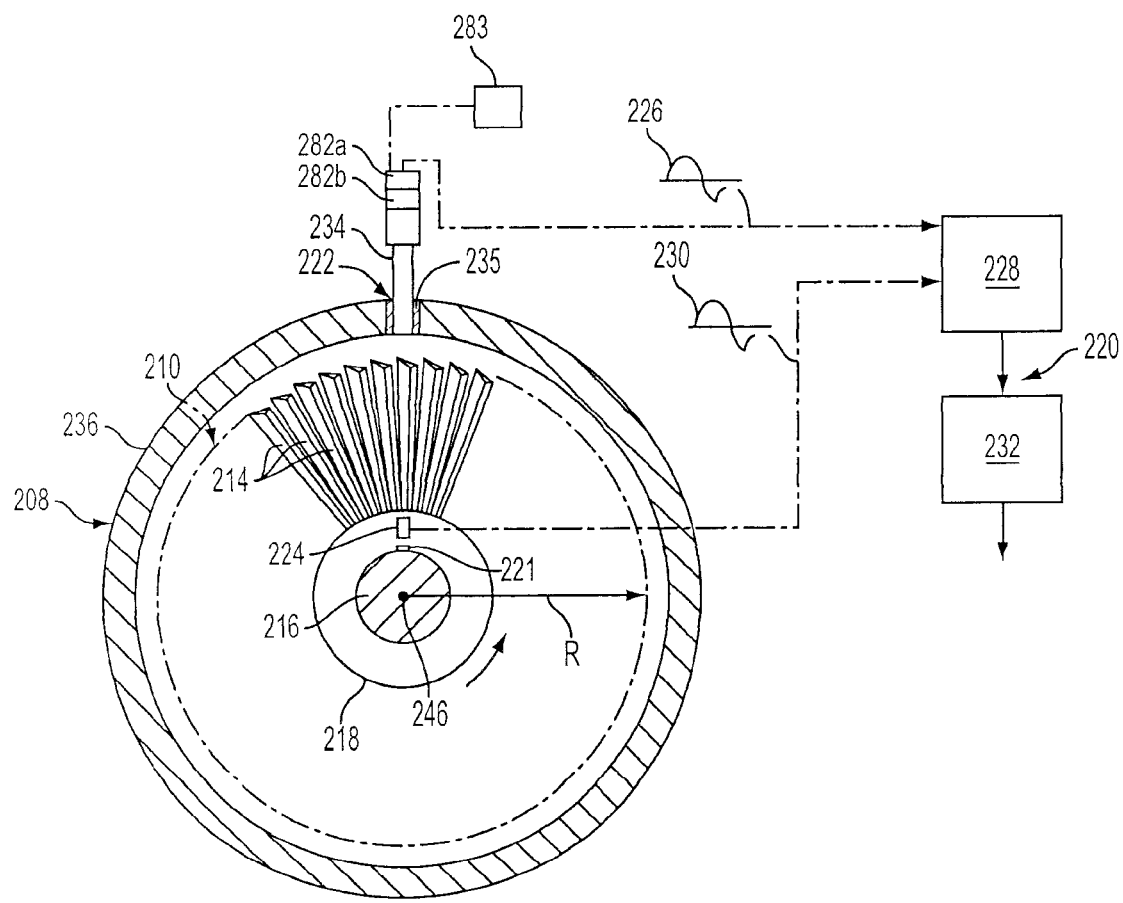
FIG. 8 is a diagrammatic view illustrating a turbine and a blade vibration monitor system incorporating the probe structure of FIG. 7.

As seen in FIG. 8, the probe 234 may include a first driver 282a for effecting rotating movement of the tracking channel 250a, and a second driver 282b for effecting movement of the measurement channel 250b. For example, the present embodiment may use known precision translation instrument heads to provide precise rotational control of each of the first and second channels 250a and 250b. The drivers 282a, 282b may comprise pulse width modulated drive DC motors operating through respective planetary gear reduction drive trains to provide a high torque precise rotational control to rotate the tracking and measurement channels 250a and 250b. The drivers 282a, 282b may operate under control of a computer in the BVM 220 or, alternatively, an additional computer 283 may be provided for controlling the rotation of the tracking and measurement channels 250a, 250b. In addition, sensors, such as optical resolvers (not shown), may be provided associated with each of the tracking and measurement channels 250a, 250b to provide an accurate indication of small digital incremental rotations of the tracking and measurement channels 250a, 250b.

Figure 6A:
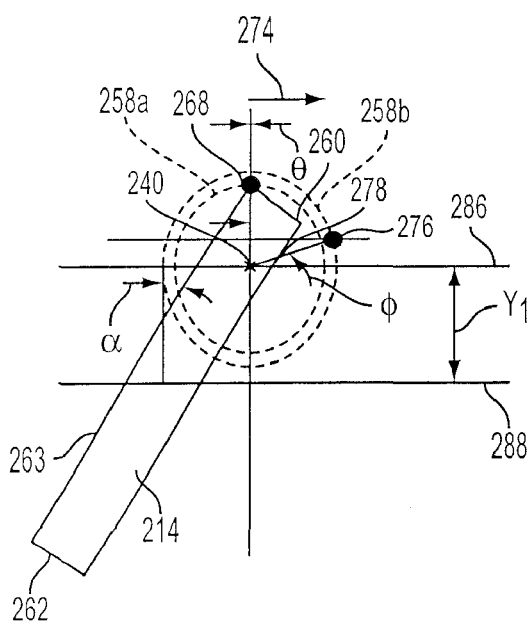
FIGS. 6A and 6B are diagrammatic views illustrating a blade tracking operation performed by the probe structure of a third embodiment of the invention.
Figure 6B:
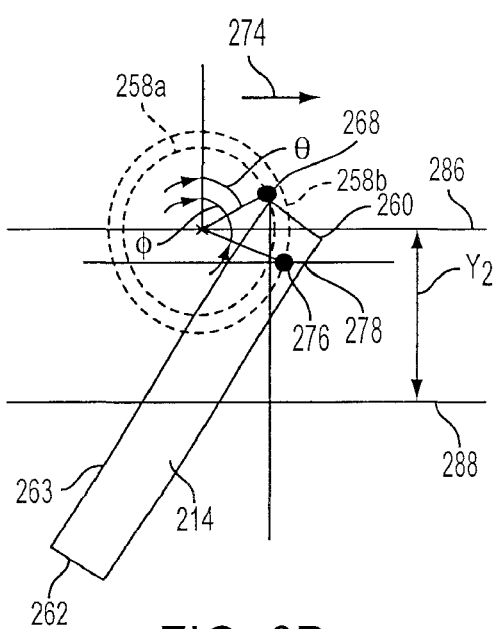
Figure 7:
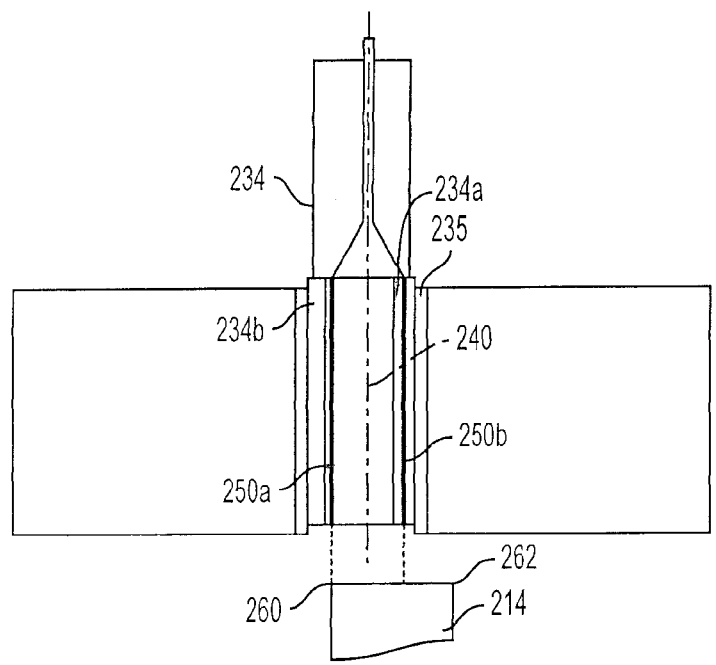
FIG. 7 is a diagrammatic elevation view of a probe structure for use in the third embodiment of the invention.

Referring to FIGS. 6A and 6B, the first driver 282a is actuated to rotate to locate the tracking channel 250a at a tracking position 268 to detect the tip leading edge 260, i.e., the trigger point 270 on the blade 214. The precise location of the tracking channel 250a, and the associated trigger point 270, may be determined from the angular measurement Θ. The first driver 280a may be controlled to continuously track the tip leading edge 260 of the blade 214. The second driver 280b may be controlled to continuously update the position of the measurement channel 250b, and associated measurement point 278, with reference to the continuously updated location of the trigger point 270. The position of the measurement channel may be determined with reference to an angle φ. The angle φ may be selected to maintain the measurement point 278 at the same location along the blade tip 263 between the tip leading edge 260 and the tip trailing edge 262 regardless of the axial displacement of the blade 214. The axial displacement of the blade 214 is the difference between dimensions $y_1$ and $y_2$ in FIGS. 6A and 6B, where $y_1$ and $y_2$ comprise measurements between a line 288 passing through the center of the blade 214 and a reference line 286 passing through the probe rotational axis 240. Hence, the current embodiment may operate to continuously provide vibration measurement signals 226 from an optimum location on the blade 214, such as a location comprising a point of peak vibration amplitude, maintaining the vibration readings from this location regardless of the axial displacement of the blade 214. Alternatively, the present embodiment may be used to automatically sweep over the entire blade tip 263 to provide measurement of a vibration profile along the entire blade tip 263.

It should be understood that each of the embodiments described above may be operated in real time, i.e., as the turbine is operating, and the location of the blade tip leading edge may be continuously and accurately determined to accurately determine the location of the measurement channel reading along the blade tip. Further, the embodiments of FIGS. 4-8 permit vibration measurements to be made simultaneously with tracking of the blade location permitting measurement of turbine compressor blade vibrations during transitional operating conditions, such as during a turbine ramp-up/ramp-down or a load change where rapid changes in the axial location of the rotor may occur.

It should also be noted that the present invention is not limited to tracking the blade tip leading edge as a reference for placement of the measurement channel. In particular, the tip trailing edge may be tracked or a separately attached physical target may be affixed to one or more blades for tracking the axial location of the blades. Alternatively, a physical modification may be made to one or more of the blade tips, such as by removing a portion of the blade tip profile for a small distance at selected location along the blade tip, e.g., removal of a 1 mm portion of the blade tip, to provide a distinguishable variation in the reflected light.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of monitoring a blade structure in a turbine comprising a plurality of radially extending blades mounted on a rotor for rotation about a rotational axis defining an axial direction, said method comprising the steps of:
    providing a probe structure including a probe supported in a probe mount adjacent said blade structure, said probe being supported for movement relative to said probe mount for sensing blade passing events;
    moving said probe to a tracking position corresponding to a first position in the axial direction to identify a location of a trigger point on said blade structure;
    moving said probe to a measurement position corresponding to a second position in the axial direction axially displaced from said first position and corresponding to a measurement point on said blade structure wherein said measurement position is determined with reference to said tracking position; and
    transmitting sensor signals from said probe to a blade vibration monitor wherein said sensor signals correspond to vibrations produced at said measurement point.

2. The method of claim 1, wherein said probe comprises a laser channel including a laser spot source and a light pulse receiver.

3. The method of claim 2, wherein said trigger point on said blade structure is defined by a blade tip leading edge.

4. The method of claim 3, wherein said probe is supported for rotation about a probe rotational axis, and angular positions of said probe define said tracking position and said measurement position.

5. The method of claim 1, wherein said controller provides a signal to said probe structure to move said probe in response to a detected axial movement of said trigger point relative to said probe.

6. The method of claim 5, wherein said probe comprises a tracking channel for sensing said trigger point and a measurement channel for sensing said measurement point, each of said tracking channel and said measurement channel including a laser spot source and a light pulse receiver.

7. The method of claim 6, including the step of rotating said probe to rotate said tracking channel and said measurement channel in coupled relation to each other wherein said controller continuously monitors an output of said tracking channel and automatically adjusts the position of said tracking channel to track said trigger point.

8. The method of claim 6, including the step of rotating said tracking channel about a probe rotational axis to track said trigger point, and rotating said measurement channel independently of said tracking channel to track said measurement point with reference to the location of said trigger point.

9. The method of claim 8, wherein said controller continuously monitors an output of said tracking channel and automatically adjusts the position of said tracking channel to track said trigger point.

10. An apparatus for monitoring a blade structure in a turbine comprising a plurality of radially extending blades mounted on a rotor for rotation about a rotational axis, said apparatus comprising:

a probe structure including a probe supported in a probe mount adjacent said blade structure, said probe being supported for movement relative to said probe mount for sensing blade passing events;

said probe including a tracking channel for tracking a trigger point on a first radially outer tip location of said blade structure and a measurement channel for detecting a measurement point on a second radially outer tip location of said blade structure, said tracking channel and said measurement channel being movable within said probe mount to adjust an axial position of said trigger point and said measurement point, respectively; and a blade vibration monitor for receiving sensor signals transmitted from said measurement channel wherein said sensor signals correspond to vibrations produced at said measurement point.

11. The apparatus of claim 10, wherein said probe structure includes a measurement channel driver and a tracking channel driver, said tracking channel driver being operably connected to said tracking channel and said measurement channel driver being operably connected to said measurement channel for moving said measurement channel independently of said tracking channel.

12. The apparatus of claim 11, wherein said measurement channel and said tracking channel are movable in rotatable movement about a rotational axis of said probe.

13. The apparatus of claim 12, wherein each said tracking channel and said measurement channel each include a laser spot source and a light pulse receiver.

14. The apparatus of claim 10, wherein said tracking channel and said measurement channel are mechanically coupled for movement together.

15. The apparatus of claim 14, wherein said tracking channel and said measurement channel each include a laser spot source and a light pulse receiver.

16. The apparatus of claim 14, wherein said tracking channel and said measurement channel are supported for rotational movement about a probe rotational axis.

* * * * *